United States Patent
Oh et al.

(10) Patent No.: US 11,010,381 B2
(45) Date of Patent: May 18, 2021

(54) METHOD FOR MANAGING INDEX

(71) Applicant: TmaxData Co., Ltd., Gyeonggi-do (KR)

(72) Inventors: Jaemin Oh, Seoul (KR); Taikyoung Kim, Gyeonggi-do (KR); Jaehyeong Cho, Gyeonggi-do (KR)

(73) Assignee: TmaxData Co., Ltd., Gyeonggi-do (KR)

( * ) Notice: Subject to any disclaimer, the term of this patent is extended or adjusted under 35 U.S.C. 154(b) by 217 days.

(21) Appl. No.: 16/021,531

(22) Filed: Jun. 28, 2018

(65) Prior Publication Data

US 2020/0004859 A1    Jan. 2, 2020

(30) Foreign Application Priority Data

Jun. 27, 2018  (KR) .................. 10-2018-0073852

(51) Int. Cl.
*G06F 16/24*     (2019.01)
*G06F 16/2453*   (2019.01)
*G06F 16/22*     (2019.01)

(52) U.S. Cl.
CPC .... *G06F 16/24542* (2019.01); *G06F 16/2246* (2019.01)

(58) Field of Classification Search
CPC . G06F 16/24542; G06F 16/2246; G06F 17/30
USPC .......................................... 707/715
See application file for complete search history.

(56) References Cited

U.S. PATENT DOCUMENTS

| | | | | |
|---|---|---|---|---|
| 5,495,609 | A * | 2/1996 | Scott .................. | G06F 16/2315 707/696 |
| 5,758,356 | A * | 5/1998 | Hara .................. | G06F 16/2343 707/683 |
| 5,903,888 | A | 5/1999 | Cohen et al. | |
| 6,278,992 | B1 | 8/2001 | Curtis et al. | |
| 7,120,637 | B2 | 10/2006 | Bailey | |
| 7,937,375 | B2 | 5/2011 | Wong | |
| 9,626,398 | B2 | 4/2017 | Graefe et al. | |
| 9,697,243 | B2 | 7/2017 | Kang et al. | |
| 2004/0133590 | A1* | 7/2004 | Henderson .......... | G06F 16/2246 |

(Continued)

FOREIGN PATENT DOCUMENTS

| JP | 2004326404 A | 11/2004 |
|---|---|---|
| JP | 2009157853 A | 7/2009 |

OTHER PUBLICATIONS

Office Action from the Korean Patent Office, dated Jul. 1, 2019 (4 pages).

*Primary Examiner* — Hicham Skhoun
(74) *Attorney, Agent, or Firm* — Brian B. Shaw, Esq.; Harter Secrest & Emery LLP

(57) ABSTRACT

According to one exemplary embodiment of the present disclosure, disclosed is a computer program stored in a computer readable storage medium. The computer program causes operations for improving data retrieval performance to be performed when the computer program is executed by one or more processors of a computing device, and the operations include: an operation of initiating an index search for retrieving a target index key from a root node of an index tree; an operation of performing an index tree search to a child node along a link connected to the child node; and an operation of reading a currently searched node and determining whether to change an index search route.

9 Claims, 11 Drawing Sheets

(56) References Cited

U.S. PATENT DOCUMENTS

| | | | |
|---|---|---|---|
| 2007/0174309 A1 | 7/2007 | Pettovello | |
| 2009/0210414 A1* | 8/2009 | Shinjo | G06F 16/2246 |
| 2010/0262617 A1* | 10/2010 | Shinjo | G06F 16/2246 |
| | | | 707/769 |
| 2013/0091110 A1* | 4/2013 | Katz | G06F 16/215 |
| | | | 707/696 |
| 2013/0297613 A1* | 11/2013 | Yu | G06F 16/2455 |
| | | | 707/741 |
| 2014/0074841 A1* | 3/2014 | Majnemer | G06F 16/2308 |
| | | | 707/737 |
| 2014/0358934 A1* | 12/2014 | Hirose | G06F 16/24553 |
| | | | 707/741 |

* cited by examiner

METHOD FOR MANAGING INDEX

CROSS-REFERENCE TO RELATED APPLICATIONS

This application claims priority to and the benefit of Korean Patent Application No. 10-2018-0073852 filed in the Korean Intellectual Property Office on Jun. 27, 2018, the entire contents of which are incorporated herein by reference.

TECHNICAL FIELD

The present disclosure relates to a method of indexing a database, and more particularly, to a method of searching for an index for improving data retrieval performance.

BACKGROUND ART

Enterprise business is rapidly expanded due to an explosive increase in data and an appearance of various environments and platforms. According to the advent of a new business environment, there is a need for more efficient and flexible data service and information processing and data management function. In line with the change, research on a database for solving issues of high performance, high availability, and expandability, which are the bases of the implementation of enterprise business, is continuously conducted.

In a database management system (DBMS), data may be stored in a data storage place. In a relational database management system (RDBMS), the data storage place may be referred to as a table. The table may include one or more rows, and each of the one or more rows may include one or more columns.

When a database includes a large amount of data, a relatively long time may be needed for performing a query for retrieving data, in which a user is interested. When a database consumes a lot of time for responding to a query, performance of the database may be negatively influenced. Accordingly, in the corresponding technical field, various schemes for decreasing a processing time for responding to a query, that is, improving performance of the DBMS, are studied.

In increasing a data retrieval speed from a database, an indexing scheme may be utilized. The index may mean a data structure, which increases an operation speed for a table in a database field. When the index is used, it is possible to decrease a time consumed for data retrieval and also decrease the amount of resources consumed for data retrieval.

In general, an index structure includes a tree structure. The tree structure is a sort of graph, and is formed of a node and a pointer indicating a node. Various nodes cannot indicate one node, but one node may indicate several nodes. When it is necessary to retrieve the huge amount of stored data, a scheme of comparing the data one by one is inefficient. When data is indexed by using a tree structure and is stored in an aligned state, it is possible to efficiently retrieve data. Traverse means a series of operations for searching for an index. The traverse is performed in a process of comparing a value of a target of search and a division value from a root node and finding a next pointer. When an index key corresponding to the value of the target of search is found by the traverse, the traverse is terminated.

A B-tree index structure among the index structures includes a key accessible to a lower level for each of the nodes. Further, when a plurality of threads corrects or refers to a B-tree index at the same time in the related art, a scheme of maintaining matching of the index through lock is used. However, the scheme has a problem in that simultaneity of the operation is degraded and performance of a system is degraded. Further, simultaneity of the operation is low due to lock contention, so that there is a probability in that performance is degraded.

Accordingly, there may be a demand in the field for an indexing method, in which when the plurality of threads is operated at the same time, it is possible to perform a search from a maximally close higher node by using an alignment characteristic of index keys present in the B-tree index even though a structure is changed.

RELATED ART LITERATURE

Patent Document (Patent Document 1) (1) U.S. Pat. No. 5,903,888
(Patent Document 2) (2) U.S. Pat. No. 6,278,992
(Patent Document 3) (3) Japanese Patent Application Laid-Open No. JP2004326404

SUMMARY OF THE INVENTION

The present disclosure is conceived in response to the foregoing background technology, and provides a method of efficiently searching for an index in a database.

According to an exemplary embodiment of the present disclosure for achieving the object, a computer program stored in a computer readable storage medium is disclosed. The computer program causes operations for improving data retrieval performance to be performed when the computer program is executed by one or more processors of a computing device, and the operations include: an operation of initiating an index search for retrieving a target index key from a root node of an index tree; an operation of performing an index tree search to a child node along a link connected to the child node; and an operation of reading a currently searched node and determining whether to change an index search route.

Alternatively, the operation of performing the index tree search to the child node along the link connected to the child node may include: an operation of performing the index search to a low-direction lower child node connected to a low-direction lower link when the target index key has a value smaller than the smallest value of the key among the values of the keys in the currently searched node; an operation of performing the index search to a high-direction lower child node connected to a high-direction lower link when the target index key has a value larger than the largest value of the key among the values of the keys in the currently searched node, or an operation of performing the index search to a center-direction lower child node connected to a center-direction lower link when the target index key has a value larger than the smallest value of the key among the values of the keys in the currently searched node and smaller than the largest value of the key among the keys in the currently searched node, and has the value, which is not included in the currently searched node.

Alternatively, the low-direction lower link may be a link connected to a child node including a key having a value smaller than the smallest value of the key included in the currently searched node among the child nodes, the high-direction lower link may be a link connected to a child node including a key having a value larger than the largest value of the key included in the currently searched node among the child nodes, and the center-direction lower link may be a link connected to a child node including a key having a value, which is larger than the smallest value of the key included in the currently searched node and is smaller than the largest value of the key included in the currently searched node among the child nodes, and which is not included in the currently searched node.

Alternatively, the operation of reading the currently searched node and determining whether to change the index search route may include an operation of comparing an upper bound key and a lower bound key of the currently searched node with the target index key and determining whether the index search route needs to be changed.

Alternatively, the upper bound key may be the largest value of the index key includable in the currently searched node, and the lower bound key may be the smallest value of the index key includable in the currently searched node.

Alternatively, the operation of comparing the upper bound key and the lower bound key of the currently searched node with the target index key and determining whether the index search route needs to be changed may include at least one of: an operation of determining to maintain the index search route when the target index key has a value smaller than the upper bound key; and an operation of determining to maintain the index search route when the target index key has a value larger than the lower bound key.

Alternatively, the method may further include an operation of reading a parent node connected with the currently searched node through a link and determining to perform the index search from the parent node when it is determined that the index search route needs to be changed.

Alternatively, the operation of reading the parent node connected with the currently searched node through the link and determining to perform the index search from the parent node when it is determined that the index search route needs to be changed may include an operation of comparing an upper bound key and a lower bound key of the parent node with the target index key and determining to perform the index search from the parent node.

According to another exemplary embodiment of the present disclosure, a method of improving data retrieval performance performed by one or more processors of a computing device is disclosed. The method may include: initiating an index search for retrieving a target index key from a root node of an index tree; performing an index tree search to a child node along a link connected to the child node; and reading a currently searched node and determining whether to change an index search route.

According to still another exemplary embodiment of the present disclosure, a computing device is disclosed. The computing device may include: one or more processors; and a memory configured to store commands executable by the one or more processors, in which the one or more processors initiate an index search for retrieving a target index key from a root node of an index tree, perform an index tree search to a child node along a link connected to the child node; and read a currently searched node and determines whether to change an index search route.

According to the present disclosure, it is possible to provide a method of efficiently searching for an index in a database.

BRIEF DESCRIPTION OF THE DRAWINGS

Various aspects are described with reference to the drawings, and herein, like reference numerals are generally used to designate like constituent elements. In the exemplary embodiment below, for the purpose of description, a plurality of specific and detailed matters is suggested in order to provide general understanding of one or more aspects. However, it will be apparent that the aspect(s) may be carried out without the specific details. In other examples, publicly known structures and devices are illustrated in the form of a block diagram for easy description of one or more aspects.

DETAILED DESCRIPTION

Figure 1:
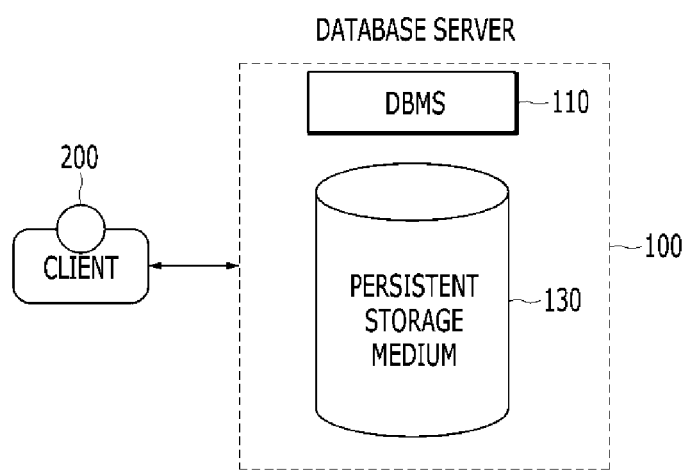
FIG. 1 is a schematic diagram illustrating a database system according to an exemplary embodiment of the present disclosure.

Various exemplary embodiments will be described with reference to the drawings, and throughout the entire drawings, a similar reference numeral is used for indicating a similar constituent element. In the present specification, various descriptions are presented for understanding the present disclosure. However, it is apparent that the exemplary embodiments may be carried out even without the particular description. In other examples, publicly known structures and devices are provided in the form of a block diagram for easily describing the exemplary embodiments.

Terms, "component", "module", "system", and the like used in the present specification indicate a computer-related entity, hardware, firmware, software, a combination of software and hardware, or execution of software. For example, a component may be a procedure executed in a processor, a processor, an object, an execution thread, a program, and/or a computer, but is not limited thereto. For example, both an application executed in a computing device and the computing device may be components. One or more components may reside within a processor and/or an execution thread, and one component may be localized within one computer or may be distributed between two or more computers. Further, the components may be executed by various computer readable media having various data structures stored therein. For example, components may communicate through local and/or remote processing according to a signal (for example, data transmitted to another system through a network, such as Internet, through data and/or a signal from one component interacting with another component in a local system and a distributed system) having one or more data packets.

The descriptions of the presented exemplary embodiments are provided so as for those skilled in the art to use or carry out the present disclosure. Various modifications of the exemplary embodiments will be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

A basic concept of an indexing technology according to an exemplary embodiment of the present disclosure is particularly discussed in U.S. Pat. No. 9,626,398 (Apr. 18, 2017) and US Patent Application Publication No. US2007-0174309 (Jul. 26, 2007), the entire contents of which are incorporated herein by reference.

FIG. 1 is a schematic diagram illustrating a database system 10 according to an exemplary embodiment of the present disclosure.

As illustrated in FIG. 1, the database system 10 according to the present disclosure may include a client 200 and a database server 100. The database server 100 in the present specification may be exchangeably used with a database.

As illustrated in FIG. 1, the client 200 may mean a node(s) in the database system having a mechanism for performing communication through a network. For example, the client 200 may include a personal computer (PC), a laptop computer, a workstation, a terminal, and/or a predetermined electronic device having network accessibility. Further, the client 200 may also include a predetermined server implemented by at least one of an agent, an application programming interface (API), and plug-in. For example, the client 200 in FIG. 1 may be related to a user (for example, database administration (DBA)) using the database server 100. In the example, the client 200 may issue various forms of queries including a data manipulation language (DML), a data definition language (DDL), and the like to the database server 100.

The database server 100 may include, for example, a predetermined type of computer system, such as a microprocessor, a main frame computer, a digital single processor, a portable device, and a device controller, or a computing device. Each of the database servers 100 may include a database management system (DBMS) 110 and a persistent storage medium 130.

FIG. 1 illustrates only one database server 100, but those skilled in the art will clearly appreciate that more database servers may also be included in the scope of the present disclosure and the database server 100 may include additional components. That is, the database server 100 may also be formed of a plurality of computing devices. A set of a plurality of nodes may form the database server 100. For example, although not illustrated in FIG. 1, the database server 100 may include one or more memories including a buffer cache. Further, although not illustrated in FIG. 1, the database server 100 may include one or more processors 120. Accordingly, the DBMS 110 may be operated by the processor 120 on the memory.

In the present specification, the memory is a main storage device, such as a random access memory (RAM) including a dynamic RAM (DRAM) and a static RAM (SRAM), to which a processor directly accesses, and may mean a volatile storage device, in which when power is cut, stored information is momentarily erased, but the memory is not limited thereto. The memory may be operated by the processor 120. The memory may temporarily store a data table including a data value. The data table may include the data value, and in the exemplary embodiment of the present disclosure, the data value of the data table may be recorded in the persistent storage medium 130 from a memory. In an additional aspect, the memory may include a buffer cache, and data may be stored in a data block of the buffer cache. The data stored in the buffer cache may be recorded in the persistent storage medium 130 by a background process.

The persistent storage medium 130 may mean a non-volatile storage medium, such as a storage device based on a flash memory and/or a battery-backup memory, which is capable of continuously storing predetermined data, as well as a magnetic disk, an optical disk, and a magneto-optical storage device. The persistent storage medium 130 may communicate with the processor 120 and the memory of the database server 100 through various communication means. In an additional exemplary embodiment, the persistent storage medium 130 may be located outside the database server 100 and communicate with the database server 100. According to the exemplary embodiment of the present disclosure, the persistent storage medium 130 and the memory may be collectively called a storage unit 140.

The DBMS 110 is a program for allowing performance of operations, such as parsing for a query, retrieval, insertion, correction, and deletion of necessary data, index generation, and/or access to an index, by the database server 100, and as described above, the DBMS 110 may be implemented by the processor 120 in the memory of the database server 100.

The client 200 and the database server 100 or the database servers may communicate with one another through a network (not illustrated). The network according to the exemplary embodiment of the present disclosure may use various wired communication systems, such as a public switched telephone network (PSTN), an x digital subscriber line (xDSL), a rate adaptive DSL (RADSL), a multi rate DSL (MDSL), a very high speed DSL (VDSL), a universal asymmetric DSL (UADSL), a high bit rate DSL (HDSL), and a local area network (LAN).

The network presented in the present specification may use various wireless communication systems, such as code division multi access (CDMA), time division multi access (TDMA), frequency division multi access (FDMA), orthogonal frequency division multi access (OFDMA), single carrier-FDMA (SC-FDMA), and other systems. For example, the network may also include a database link (dblink), and thus, the plurality of database servers may communicate with one another through the database link and fetch data from another database server 100. The technologies described in the present specification may also be used in other networks, as well as the foregoing networks.

Figure 2:
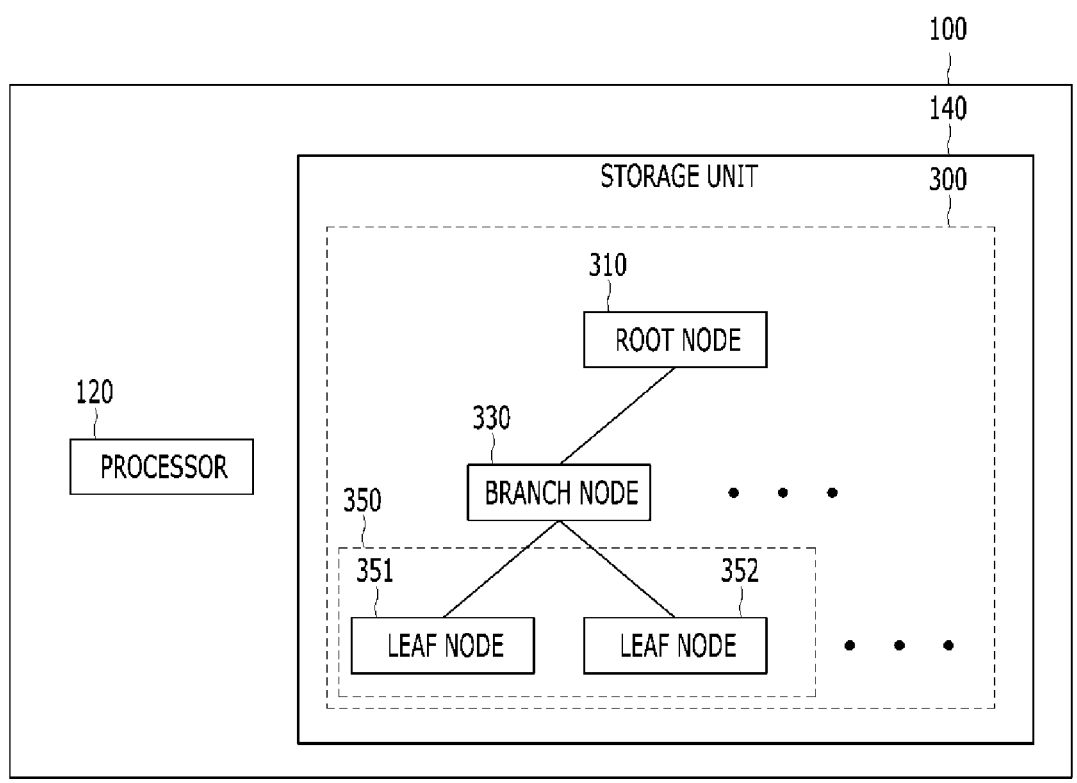
FIG. 2 is a block diagram of a database server according to the exemplary embodiment of the present disclosure.

FIG. 2 is a block diagram of the database server 100 according to the exemplary embodiment of the present disclosure.

As illustrated in FIG. 2, the database server 100 may include the processor 120 and the storage unit 140. Herein, the storage unit 140 may be a concept collectively calling the memory and the persistent storage medium 130 as described with reference to FIG. 1. Further, the DBMS 110 may be executed by the processor 120 and stored in the memory and/or the persistent storage medium 130. In this case, the storage unit 140 may communicate with the processor 120 and control storage/management of data.

The processor 120 may perform various operations, which are to be described below, by executing the EBMS 110 in the memory. Further, the processor 120 may include one or more threads and allow a predetermined operation to be performed for each thread. For example, the processor 120 may perform a generation operation of a database index tree 300. As another example, the processor 120 may perform a traverse for a target index key value through the generated database index tree 300, that is, a search for a target index key value in the index tree 300. The description of the operation of the processor 120 is simply illustrative, and the present disclosure is not limited thereto.

In the context below, an index key value may mean a value allocated to data stored in the storage unit 140 in a logical order. Accordingly, an index key value of the data included in each node may be positioned in each node (for example, a root node 310, a branch node 330, and a leaf node 350) of the database index tree 300. Further, all of the index key values in the index tree 300 may be stored in a sequentially aligned state. Further, the index key value in each node may be stored in a sequentially aligned state.

A target index key value may mean an index key value corresponding to data, which needs to be searched in the index tree 300. The target index key value may be determined based on a query issued from the client 200. Further, since the data, which each thread needs to access, is different, a target index key value allocated for each thread may be different.

The processor 120 according to the exemplary embodiment of the present disclosure may initiate an index search for retrieving a target index key from the root node 310 of the index tree 300. More particularly, the processor 120 may determine a target index key value desired to be searched based on a query issued from the client 200. Further, the processor 120 may allocate a target index key value to an index search thread, which performs an index search. Further, the index search thread may perform a search from the root node 310 that is the top node of the index tree 300 to the branch node 330 and the leaf node 350 that is the lowest level.

Herein, similar to the root node 310 and the branch node 330, in the case of a node including other nodes in a lower level, each node may include one or more lower links connected to the node of the lower level. Herein, the lower link may mean an address value for performing a search from the root node 310 to the branch node 330 or from the branch node 330 to the left node 350. That is, the lower link may include an address value of a child node located in a parent node in order to perform a search from a parent node to a child node. Further, each lower link may be divided into one among a low-direction lower link, a center-direction lower link, and a high-direction lower link according to an index key included in a node of a lower level. More particularly, the low-direction lower link may be a link connected with a lower leaf node 351 including a key having a value smaller than the smallest value of a key among the values of the keys included in a currently searched node in the branch node 330. Further, the high-direction lower link may be a link connected with a lower leaf node 353 including a key having a value larger than the largest value of the key among the keys included in the currently searched node in the branch node 330. Further, the center-direction lower link may be a link connected with a lower leaf node 352 including a key having a value between the smallest value and the largest value of the key included in the currently searched node in the branch node 330. Further, according to an exemplary embodiment, when the index keys included in the node are two or more, the corresponding node may include the center-direction lower link connected with the lower leaf node corresponding to a section formed by each index key. That is, the center-direction lower link may be a link connected with the lower leaf node including a key having a value, which is larger than the smallest value of the key included in the currently searched node and is smaller than the largest value of the key included in the currently searched node, and which is not included in the currently searched node, in the left node 350.

The processor 120 may perform an index tree search from a parent node to a child node along a link connected to the child node. The processor 120 may compare an index key value included in each index node and a target index key value and determine a link along which the search is to be performed. Further, the processor 120 may proceed to search for an index along the lower link connected to the determined leaf node 350.

More particularly, all of the index keys may be stored in the sequentially aligned state in the B-tree index structure. All of the index keys may be stored in the sequentially aligned state in each node. For example, each node of the index tree may be one or more data blocks. Accordingly, the processor 120 may access the root node 310, which is the top level, and compare the index key value included in the root node 310 and the target index key value to be searched. Further, when the target index key has the value smaller than the smallest value of the key among the values of the keys in the root node 310, the processor 120 may perform the index search to the low-direction branch node 330 connected to a low-direction lower link. Further, when the target index key has the value larger than the largest value of the key among the values of the keys in the root node 310, the processor 120 may perform the index search to a high-direction branch node connected to a high-direction lower link. Further, according to an exemplary embodiment, when the target index key has the value larger than the smallest value of the key among the values of the keys in the root node 310 and smaller than the largest value of the key among the keys in the root node 310, and has the value, which is not included in the root node 310, the processor 120 may perform the index search to a center-direction branch node connected to a center-direction lower link. Further, the processor 120 may determine the leaf node 350 to be searched by accessing the branch node 330 and performing the same operation.

Figure 3:
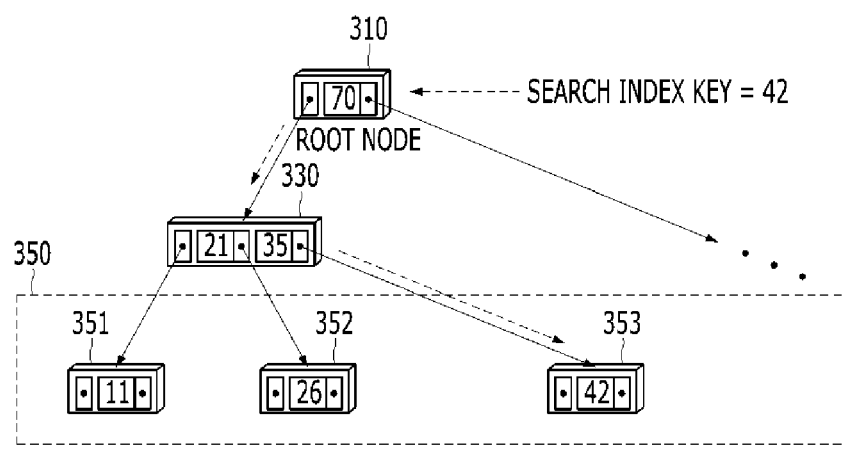
FIG. 3 is a diagram illustrating an example, in which a processor performs an index search through an index tree according to the exemplary embodiment of the present disclosure.

For example, as illustrated in FIG. 3, the processor 120 may determine a target index key value, that is, 42, based on the query received from the client 200. Further, the processor 120 may determine to make the index search thread search for data, of which an index key value is 42, in the index tree 300. Accordingly, the index search thread may access the root node 310 including the low-direction lower link and the high-direction lower link together with an index key value of 70. Further, the index search thread may compare 42 corresponding to the target index key value and the index key value of 70 corresponding to the root node 310, and determine to perform the index search to the low-direction branch node 330. Further, the index search thread may access the branch node 330 including the index key values of 21 and 35. Further, the branch node 330 may include three lower links connected to a low-direction lower child node 351 corresponding to an index key value, which is less than 21, a center-direction lower leaf node 352 corresponding to an index key value, which is equal to or smaller than 21 and less than 35, and a high-direction lower child node 353 corresponding to an index key value, which is equal to or larger than 35. Further, the index search thread may compare 42 corresponding to the target index key value and the index key values of 21 and 35, and determine to perform the index search to the high-direction lower leaf node 353. Accordingly, the index search thread may access the high-direction lower leaf node 353 and obtain a data address value corresponding to the target index value. The detailed operation of the index search thread and the numerical value limitation are simply illustrative, and the present disclosure is not limited thereto.

When it is determined that a structure of the index tree 300 is changed, the processor 120 may determine whether an index search route needs to be changed. More particularly, when it is determined that a structure of the index tree 300 is changed, the processor 120 may make the index search thread retry the index search. Further, when it is not determined that a structure of the index tree 300 is changed, the processor 120 may make the index search thread continuously perform the index search. This will be described in detail with reference to FIG. 4.

The storage unit 140 according to the exemplary embodiment of the present disclosure may store predetermined data stored in association with task performance of the database server 100. The storage unit 140 may include the DBMS 110 and/or the persistent storage medium 130. In addition, the storage unit 140 may also generate a table (for example, an index table) and the like on the database server 100. For example, the generation of the tables may also be performed by a separate component, such as a control module (not illustrated). Further, the storage unit 140 may process and manage a request related to the storage (including update) of data. The storage unit 140 may determine the storage of the data, the index table, and the like. Further, the storage unit 140 may determine a storage position for data and/or an index table. For example, the storage unit 140 may determine a storage position of data in a data table. As another example, the storage unit 140 may determine a storage position of data in the persistent storage medium 130. The storage unit 140 may store the generated database index tree 300.

The storage unit 140 according to the exemplary embodiment of the present disclosure may store the database index tree 300 as illustrated in FIG. 2. Herein, the database index tree 300 may have a form, in which a plurality of sub index structures are hierarchically provided. The database index tree 300 stored in the storage unit 140 illustrated in FIG. 2 includes one root node 310, one branch node 330, and two lower leaf nodes 350, but this is simply illustrative for convenience of the description, the predetermined number and the predetermined form of nodes may form the database index tree 300 within the range without departing from the spirit of the contents of the present disclosure.

For example, the database index structure may include a root node of a top level and a left node of the lowest level, and may include a branch node in a level between the root node and the leaf node. In the present disclosure, regarding a parent node and a child node, a node of a higher level among the plurality of nodes may be a parent node and a node of a lower level may be a child node. A parent node may include a link including an address of a child node. A root node may be a node, in which a parent node is not present, and a leaf node may be a node, in which a child node is not present.

According to the exemplary embodiment of the present disclosure, one or more parent nodes (for example, the root node 310 and/or the branch node 330) in the plurality of sub index structures may include a start ROWID value of the sub index structure of the lower level of the one or more parent nodes and an address value for accessing the sub index structure of the lower level. Accordingly, a parent node may point a child node(s), so that the index search may be performed from a higher level to a lower level in the index structure. The processor 120 may check a condition of each node during the performance of the index search and perform a calculation based on the condition. The condition may indicate whether a target index key value of a target of search is included in a range of an index key value included in a node.

More particularly, when the processor 120 performs the index search from the root node 310, the processor 120 may determine a branch node 330, in which the search is to be performed, by using an index key included in the root node 310 as a branch value (that is, a value determining a direction of the branch node 330, in which the search is to be performed) to the branch node 330 and based on an address (data block address (DBA) of the branch node 330. Further, the processor 120 may determine a leaf node 350, on which the search is to be performed, among the leaf nodes 350 even in the branch node 330 by the same method.

Based on bound information obtained during the index search process while the index search thread searches for the index, even when the structure of the index tree 300 is changed by another thread, it is possible to retry the search in a close node while maximally maintaining the search route. Accordingly, it is possible to considerably reduce a probability in that the processor 120 performs the re-search from the root node 310 in the simultaneous operation environment, thereby remarkably decreasing an index search time.

By the foregoing characteristic, it is possible to improve a data processing rate of a computing device, and guarantee matching of the index structure and improve simultaneity of an operation in the simultaneous operation environment, thereby efficiently improving performance of the database system 10.

FIG. 3 is a diagram illustrating an example, in which the processor 120 performs the index search through the index tree 300 according to the exemplary embodiment of the present disclosure.

The processor 120 according to the exemplary embodiment of the present disclosure may perform an index tree search from the root node. Further, the processor 120 may read each of the currently searched node and determine whether the structure of the index tree 300 is changed.

The change in the structure of the index tree 300 may include changes in the index, in which the index search route may be changed. For example, the change in the structure of the index tree 300 may include at least one of a split of a node, an insertion of a key value to a node, a deletion of a key value from a node, a change in a key value in a node, and a change in a node connection link.

The processor 120 may determine whether to continuously perform the search in the index tree 300 by the index search thread. Further, the processor 120 may compare 42 corresponding to the target index key value with the index key value of 70 corresponding to the root node 310, and determine to perform the index search for the low-direction branch node 330. Accordingly, the index search thread may access the branch node 330 including the index key values of 21 and 35. The processor 120 may determine whether the current searched node (in the present example, the branch node 330), which will be described below, satisfies a traverse condition, and determine whether the structure of the index is changed and whether the index search route needs to be changed. The processor 120 may determine whether the index search route needs to be changed (that is, whether the search needs to be performed from the root node, or the search needs to return to a previous searched node and be re-performed). Further, the processor 120 may determine to perform the re-search for the index tree 300 by the index search thread. Herein, the re-search for the index tree 300 may be performed from the node (for example, the root node 310) of the top level or from a parent node (that is, a predetermined branch node between the root node and the currently searched node) of a predetermined level. The description of the numerical value of the index key value is simply illustrative, and the present disclosure is not limited thereto.

The processor 120 according to the exemplary embodiment of the present disclosure additionally may check information about the corresponding node and determine whether the structure of the index tree 300 is changed. Further, when it is determined that the structure of the index tree 300 is changed, the processor 120 may determine whether the index search route needs to be changed. More particularly, the processor 120 may determine whether to maintain the index search route through the information about the corresponding node and the target index key value. This will be described in detail with reference to FIG. 4.

When it is determined that the structure of the index tree 300 is changed, the processor 120 according to the exemplary embodiment of the present disclosure may determine whether the index search route needs to be changed.

When the index search thread approaches a node, the processor 120 according to the exemplary embodiment of the present disclosure may obtain information about at least one of an upper bound key and a lower bound key of the corresponding node. Herein, the upper bound key may mean the largest value of the key among the values of the index keys includable in the node. That is, the upper bound key and the lower bound key may be boundaries for determining an index key value includable in a corresponding node in the index tree structure. In the example of FIG. 4B, parent node N1 411 has index key values of 11 and 15 and child node N3 431 is connected with parent node N1 411 through a link (that is, a center-direction lower link) located between 11 and 15, so that only the index key values between 11 and 15 may be included in child node N3 431. That is, in this case, 11 may be a lower bound key of child node N3 431 and 15 may be an upper bound key of child node N3 431. That is, each node may have at least one of an upper bound key and a lower bound key. In an example of FIG. 4B, child node N4 432 is connected with a high-direction lower link of parent node N1 411 and may include only an index key value larger than 15, so that 15 may be a lower bound key of child node N4 432, and there may be no upper bound key (in this case, the upper bound key may also be unlimitedly processed according to an exemplary embodiment). The values of the upper bound key and the lower bound key and the structure of the index are simply illustrative, and the present disclosure is not limited thereto. An upper bound key and a lower bound key may be determined for each node, and the processor 120 may determine at least one of an upper bound key and a lower bound key for each node when the structure of the index tree is changed.

That is, information about a lower bound and an upper bound of a node may specify the smallest value and the largest value of an index key includable in a corresponding node. Further, when the index structure of the corresponding node is changed by an index structure change thread, information about the upper bound and the lower bound of each node may be updated. Further, the index structure change thread may update the information about the upper bound and/or the lower bound of the involving nodes.

The processor 120 according to the exemplary embodiment of the present disclosure may compare the upper bound key and the lower bound key of the branch node 330 with the target index key, and determine whether the index search route needs to be changed. That is, the upper bound key and/or the lower bound key may be utilized for determining a node, from which the search is re-tried, when the structure of the accessed node is changed.

More particularly, when at least one of the obtained upper bound key and lower bound key satisfies the traverse condition, the processor 120 may determine to maintain the index search route.

Herein, the traverse condition is a condition for maintaining the index search route by the processor 120, and may be different according to the existence of an upper bound key and/or a lower bound key for each node. For example, in the case where the processor 120 performs the search in the node, in which only an upper bound key exists, when the target index key is smaller than the upper bound key, the processor 120 may determine that the traverse condition is satisfied. Further, in the case where the processor 120 performs the search in the node, in which only a lower bound key exists, when the target index key is larger than the lower bound key, the processor 120 may determine that the traverse condition is satisfied. Further, in the case where the processor 120 performs the search in the node, in which both an upper bound key and a lower bound key exist, when the target index key is larger than the lower bound key and is smaller than the upper bound key, the processor 120 may determine that the traverse condition is satisfied. Herein, the traverse condition may be a condition, in which the target index key is equal to or larger than the lower bound key and is less than the upper bound key, a condition, in which the target index key exceeds the lower bound key and is equal to or smaller than the upper bound key, a condition, in which the target index key is equal to or larger than the lower bound key and is equal to or smaller than the upper bound key, and a condition, in which the target index key exceeds the lower bound key and is less than the upper bound key. Accordingly, when the traverse condition is satisfied, the processor 120 may determine to maintain the index search route to the corresponding node. That is, when the traverse condition is satisfied, the processor 120 may continuously perform the index search from the currently searched node without resuming the index search from the root node.

For example, as illustrated in FIG. 3, the processor 120 may obtain information indicating that the upper bound key is 70 based on the information recorded in the branch node 330. Accordingly, the target index key value of 42 is smaller than the upper bound key value of 70 of the branch node 330, so that the processor 120 may determine to maintain the index search route. That is, the processor 120 may determine that the structure of the index tree 300 is changed after the index search, but the search route to the corresponding branch node 330 may be maintained. That is, according to the exemplary embodiment of the present disclosure, the structure of the index tree 300 is changed after the initiation of the index search, but the result obtained by searching the index up to the branch node 330 is valid, so that the processor 120 may determine that it is not necessary to perform a re-search from the root node 310, and it is possible to obtain the same result as that obtained by performing a re-search from the root node 310 even when the search is performed from the branch node 330 based on at least one of the upper bound and the lower bound. The limitation of the numerical values of the index key and the target index key is simply illustrative, and the present disclosure is not limited thereto.

When it is determined that the index search route needs to be changed, the processor 120 may read a previous node (that is, a parent node) connected with the branch node 330 through a link based on the determination and determine to perform the index search from the previous node. Herein, the previous node may mean a node of a higher level based on the accessed branch node 330 for performing the search by the index search thread.

More particularly, when at least one of the upper bound key and the lower bound key of the node, in which the change in the structure of the index tree 300 is generated after the start of the index search, does not satisfy the traverse condition, the processor 120 may determine that the index search route needs to be changed. Herein, the traverse condition is a condition for determining, by the processor 120, to maintain the index search route, and may be different according to existence of the upper bound key and/or the lower bound key in the searched node. For example, when only the upper bound key is present in the node and the target index key is larger than the upper bound key of the node, the processor 120 may determine that the traverse condition is not satisfied. Further, when only the lower bound key is present in the node and the target index key is smaller than the lower bound key of the node, the processor 120 may determine that the traverse condition is not satisfied. Further, when both the upper bound key and the lower bound key are present in the node and the target index key is not included in a section between the lower bound key and the upper bound key, the processor 120 may determine that the traverse condition is not satisfied. Accordingly, when the traverse condition is not satisfied, the processor 120 may determine that the index search route needs to be changed. In this case, the processor 120 may determine to re-perform the search from a previous node of the branch node 330 (that is, a parent node of the branch node), which the index search thread accesses.

Based on the bound information obtained during the index search process while the index search thread searches for the index, even when the structure of the index tree 300 is changed by another thread, it is possible to retry the search in a close node while maximally maintaining the search route. Accordingly, it is possible to considerably reduce a probability in that the processor 120 performs the re-search from the root node 310 in the simultaneous operation environment, thereby remarkably decreasing an index search time. Further, even when the structure change, such as a split, of the index node is generated during the search, the search route may not be changed, so that a lock is not required for the index node, and lock contention between the thread searching for the index and the thread changing the index is not required, thereby improving simultaneity and improving an index processing rate of a computing device.

By the characteristic, it is possible to improve a data processing rate of a computing device, and guarantee matching of the index structure and simultaneity of an operation in the simultaneous operation environment, thereby efficiently improving performance of the database system 10.

Figure 4A:
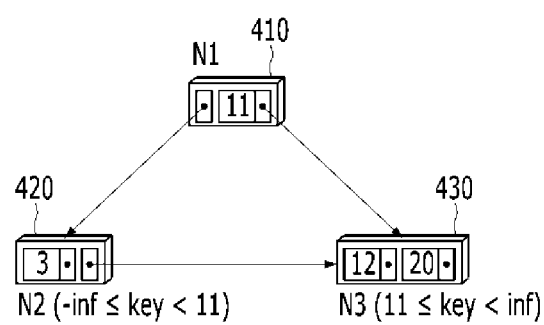
FIGS. 4A and 4B are diagrams of an example of a change in a structure of an index tree according to the exemplary embodiment of the present disclosure.
Figure 4B:
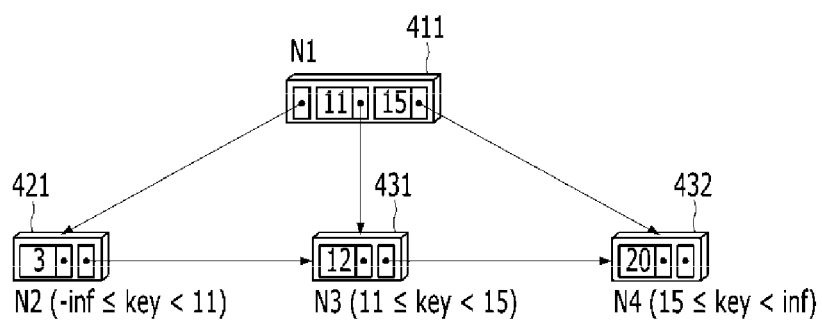

FIGS. 4A and 4B are diagrams of an example of a change in a structure of the index tree 300 according to the exemplary embodiment of the present disclosure.

The change in the structure of the index tree 300 according to the exemplary embodiment of the present disclosure may include changes for the index, by which the index search route may be changed. For example, the change in the structure of the index tree 300 may include at least one of split of a node, an insertion of a key value in a node, a deletion of a key value from a node, a change in a key value in a node, and a change in a node connection link.

For example, the index tree 300 may be formed of one parent node N1 410 and two child nodes N2 420 and N3 430 as illustrated in FIG. 4A. Further, the processor 120 may insert a key value to root node N1 410 in the index tree 300, and split lower leaf node N3 430 to change the structure of the index tree 300. Accordingly, the processor 120 may allow the index tree 300 to include one parent node N1 411 and three child nodes N1 421, N2 431, and N3 432 as illustrated in FIG. 4B. The change in the structure of the index tree 300 is simply illustrative, and the present disclosure is not limited thereto. Further, the processor 120 may update information about an upper bound and a lower bound included in each node so as to correspond to the changed structure of the index tree 300.

The processor 120 may determine to change the index search route by using one of the upper bound key and the lower bound key, or by using both the upper bound key and the lower bound key according to a node split scheme of the index tree 300. Herein, the node split scheme may be divided into a minimum of two schemes according to a scheme, in which a key included in a corresponding node is shifted to a newly generated node.

More particularly, the node split is an operation of shifting a part of an index key included in an index node to a new node, and may be performed by at least one scheme of a scheme of shifting a key having a large size among the index keys included in an index node to a new node, and a scheme of shifting a key having a small size among the index keys included in an index node to a new node. First, in the scheme of shifting a key having a large size among the index keys included in an index node to a new node, a lower bound key of an existing node is not changed, and only an upper bound key may be changed. Accordingly, the processor 120 may record information about the upper bound key for each node included in the index tree 300, and utilize the recorded information for the index search. Further, in at least one of the scheme of shifting a key having a small size among the index keys included in an index node to a new node, an upper bound key of an existing node is not changed, and only a lower bound key may be changed. Accordingly, the processor 120 may record information about the lower bound key for each node included in the index tree 300, and utilize the recorded information for the index search.

Depending on the exemplary embodiment, the node split may be performed by a scheme of shifting a key having a large size among the index keys to a new first node and shifting a key having a small size among the index keys to a new second node. In this case, an upper bound key and a lower bound key of an existing node may be simultaneously changed. Accordingly, the processor 120 may record information about the upper bound key and the lower bound key for each node included in the index tree 300, and utilize the recorded information for the index search.

The processor 120 according to the exemplary embodiment of the present disclosure may record bound information in each of the nodes included in the index tree 300. Further, the processor 120 may cause the index search thread to obtain bound information of the root node 310 and the branch node 330 accessed. Herein, each node may include information about at least one of an upper bound key and a lower bound key according to the node split scheme. Further, when only the information about the upper bound key is recorded in the corresponding node and the target index key is smaller than the upper bound key, only the information about the lower bound key is recorded in the corresponding node and the target index key is larger than the lower bound key, or both the information about the upper bound key and the lower bound key is recorded in the corresponding node and the target index key corresponds to a range between the upper bound key and the lower bound key, the processor 120 may determine to maintain the index search route even when the structure of the index tree 300 is changed.

In the example of FIG. 4, parent node N1 410 may be connected with child node N2 420 and child node N3 430 through the link. Child node N2 420 may be connected with the low-direction lower link of parent node N1 410, and child node N3 430 may be connected with the high-direction lower link of parent node N1 410. Child node N2 420 is connected with the low-direction lower link of parent node N1 410 before the change in the index structure, and may include only a value smaller than the index key value included in parent node N1 410, so that a lower bound key of child node N2 420 is not present (or the lower bound key may also be processed with a negative infinite value or a sufficiently small predetermined value (for example, 0)) and the upper bound key is 11. Child node N3 430 is connected with the high-direction lower link of parent node N1 410 before the change in the index structure, and may include only a value larger than the index key value included in parent node N1 410, so that an upper bound key of child node N3 430 is not present (or a positive infinite value or a sufficiently large predetermined value (for example, a predetermined value larger than the number of rows of the table)) and the lower bound key is 11.

By the change in the node structure of the computing device, the index key of 15 may be inserted into parent node N1 410, and child node N3 430 may be split to child node N3 431 including the index key of 12 and child node N4 432 including index key of 20. The change in the structure may be performed while the processor 120 performs the index search. Child node N2 420 is connected with the low-direction lower link of parent node N1 410 after the change in the index structure, and may include only a value smaller than the index key value included in parent node N1 410, so that a lower bound key of child node N2 420 is not present (or the lower bound key may also be processed with a negative infinite value or a sufficiently small predetermined value (for example, 0)) and the upper bound key is 11. Child node N3 431 is connected with the center-direction lower link of parent node N1 410 after the change in the index structure, and may include only an index key value between the largest value and the smallest value among the index key values included in parent node N1 410, so that an upper bound key of child node N3 430 is 15, which is the largest value among the index keys included in parent node N1 410 and the lower bound key is 11. Child node N4 432 is connected with the high-direction lower link of parent node N1 410 after the change in the index structure, and parent node N1 410 may include only a value larger than the index key value included in parent node N1 410, so that the lower bound key is 15.

In the example, the processor 120 starts the search for the target index key of 20 before the change in the index structure, reads parent node N1 410 and obtains a link heading child node N3 430, and when the structure of the index is changed, the processor 120 performs the search on the child node N3 431, but child node N3 431 does not include the index key of 20 after the split. In this case, the processor 120 may compare the size of the upper bound key (in this case, 15) and the size of the lower bound key (in this case, 11) of child node N3 431 with the target index key (in this case, 20) and determine whether the traverse condition is satisfied. In this case, the target index key of 20 is the value larger than that of the upper bound key, so that the traverse condition may not be satisfied. When it is determined that the traverse condition is not satisfied, the processor 120 may determine that the change in the structure of the index tree generated after the search may influence the search route, and may return to parent node N1 410 of child node N3 431 and resume the search. Although not illustrated in FIGS. 4A and 4B, when the parent node does not satisfy the traverse condition, the processor may return to the parent node (that is, the node two levels higher than the node, in which the index structure change is detected) of the corresponding node and determine whether the traverse condition is satisfied. The processor 120 may determine whether the structure of the index tree is changed after the initiation of the search based on the satisfaction of the traverse condition. When the processor 120 identifies the node, which does not satisfy the traverse condition, the processor 120 may determine that the structure of the index tree is changed after the initiation of the search. The index key and the change in the structure of the index tree are simply illustrative, and the present disclosure is not limited thereto.

In the example of the change in the structure of the index tree, when the target index key is 14, the processor 120 may read child node N3 431, and determine that the target index key is smaller than the upper bound key of child node N3 431 and is larger than the lower bound key of child node N3 431. In this case, the traverse condition is satisfied, so that the processor 120 may determine that the search up to child node N3 431 is valid despite the change in the structure of the index tree after the initiation of the search (that is, even though the processor 120 performs a re-search from the root node, the processor 120 may reach child node N3 431). In this case, the processor 120 does not return to the parent node and may continuously search for the index in child node N3 431. The index key and the change in the structure of the index tree are simply illustrative, and the present disclosure is not limited thereto.

Based on bound information obtained during the index search process while the index search thread searches for the index, even when the structure of the index tree 300 is changed by another thread, it is possible to retry the search in a close node while maximally maintaining the search route. Accordingly, it is possible to considerably reduce a probability in that the processor 120 performs the re-search from the root node 310 in the simultaneous operation environment, thereby remarkably decreasing an index search time.

By the characteristic, it is possible to improve a data processing rate of a computing device, and guarantee matching of the index structure and improve simultaneity of an operation in the simultaneous operation environment, thereby efficiently improving performance of the database system 10.

Figure 5:
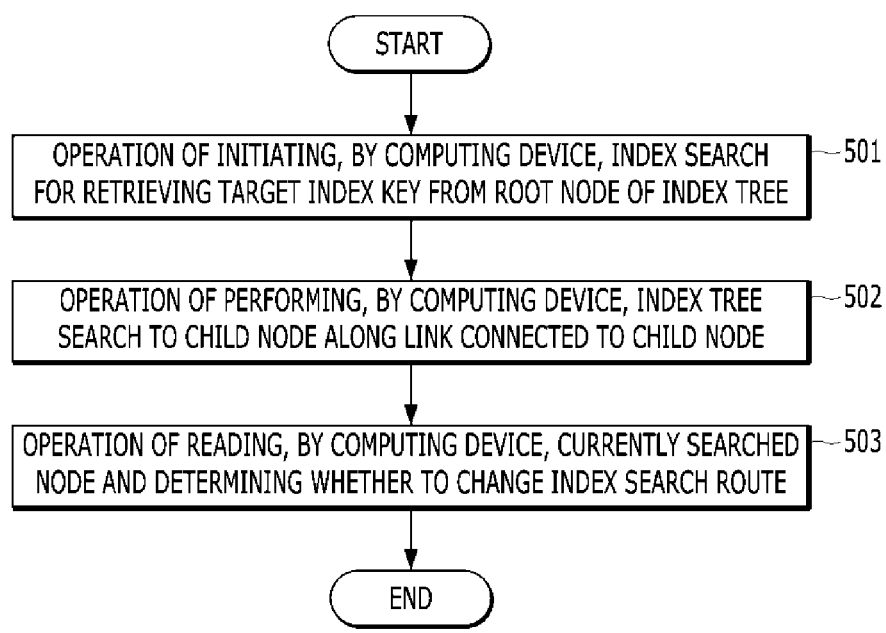
FIG. 5 is a flowchart of an index searching method according to an exemplary embodiment of the present disclosure.

FIG. 5 is a flowchart of an index searching method according to an exemplary embodiment of the present disclosure.

An index search according to the exemplary embodiment of the present disclosure may be performed by a computing device. Herein, the computing device may include one or more processors 120 and a memory storing commands executable in one or more processors. Hereinafter, a sequence of searching for a specific index in the index tree 300 by the computing device will be described in detail.

The computing device according to the exemplary embodiment of the present disclosure may initiate an index search for retrieving a target index key from the root node 310 of the index tree 300 (501). More particularly, the computing device may determine a target index key value desired to be searched based on a query issued from the client 200. Further, the computing device may allocate the target index key value to an index search thread, which performs the index search. Further, the index search thread may perform a search from the root node 310 that is the top node of the index tree 300, to the branch node 330 and the leaf node 350 that is the lowest operation.

The computing device may perform an index tree search to a child node along a link connected to the child node (502). The computing device may perform the index search from a parent node (that is, the currently searched node) to the child node along the link. The computing device may perform the index tree search to the leaf node 350 along the link connected to the branch node 330 (502). The computing device may compare an index key value included in each index node and a target index key value, and determine the leaf node 350, in which the search is to be performed. Further, the computing device may perform the index search along a lower link connected to the determined leaf node 350.

More particularly, all of the index keys may be stored in the sequentially aligned state in the B-tree index structure. All of the index keys may be stored in the sequentially aligned state in each node. For example, each node of the index tree may be one or more data blocks. Accordingly, the processor 120 may access the root node 310, which is the top level, and compare the index key value included in the root node 310 and the target index key value to be searched. When the target index key has a value smaller than the smallest value of the key among the values of the keys in the root node 310, the computing device may perform the index search to the low-direction branch node 330 connected to a low-direction lower link. Further, when the target index key has a value larger than the largest value of the key among the values of the keys in the root node 310, the computing device may perform the index search to a high-direction branch node connected to a high-direction lower link. Further, according to an exemplary embodiment, when the target index key has a value larger than the smallest value of the key among the values of the keys in the root node 310 and smaller than the largest value of the key among the keys in the root node 310, and has the value, which is not included in the root node 310, the computing device may perform the index search to a center-direction branch node connected to a center-direction lower link. Further, the computing device may determine the leaf node 350, which is to be searched, by accessing the branch node 330 and performing the same operation.

The computing device may read a currently searched node for each node during the index search and determine whether an index search route is changed (503). Further, the computing device may determine whether a structure of the index tree 300 is changed. More particularly, the computing device may compare an upper bound key and a lower bound key of the currently searched node with the target index key, and determines whether the structure of the index tree is changed and whether to change an index search route. When the currently searched node does not satisfy the traverse condition, the computing device may determine that the structure of the index tree is changed, and in this case, the computing device may change the index search route. When it is determined to change the index search route, the computing device may perform a re-search from a parent node. The computing device may determine whether the structure of the index tree 300 is changed by checking the traverse condition in the corresponding node.

Based on information about the upper bound key and the lower bound key obtained during the index search process while the index search thread searches for the index, even when the structure of the index tree 300 is changed by another thread, it is possible to retry the search in a close node while maximally maintaining the search route. Accordingly, it is possible to considerably reduce a probability in that the computing device performs the re-search from the root node 310 in the simultaneous operation environment, thereby remarkably decreasing an index search time.

By the foregoing characteristic, it is possible to improve a data processing rate of the computing device, and guarantee matching of the index structure and improve simultaneity of an operation in the simultaneous operation environment, thereby efficiently improving performance of the database system 10.

Figure 6:
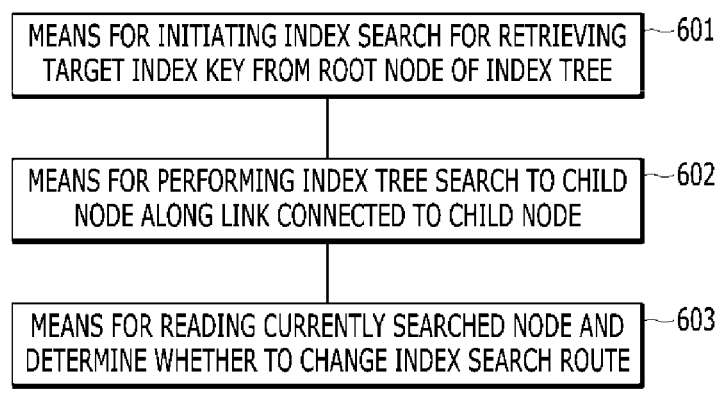
FIG. 6 is a block diagram illustrating a means for performing an index search in the database system according to the exemplary embodiment of the present disclosure.

FIG. 6 is a block diagram illustrating a means for performing an index search in the database system 10 according to the exemplary embodiment of the present disclosure.

The method of improving performance of data retrieval according to the exemplary embodiment of the present disclosure may be implemented by the means described below.

The method of improving performance of data retrieval according to the exemplary embodiment of the present disclosure may be implemented by a means 601 for initiating an index search for retrieving a target index key from a root node of an index tree, a means 602 for performing an index tree search to a child node along a link connected to the child node, and a means 603 for reading a currently searched node and determining whether an index search route is changed.

Alternatively, the means for performing the index tree search to the child node along the link connected to the child node may include a means, which performs the index search to a low-direction lower child node connected to a low-direction lower link when the target index key has a value smaller than the smallest value of the key among the values of the keys in the currently searched node, performs the index search to a high-direction lower child node connected to a high-direction lower link when the target index key has a value larger than the largest value of the key among the values of the keys in the currently searched node, or performs the index search to a center-direction lower child node connected to a center-direction lower link when the target index key has a value larger than the smallest value of the key among the values of the keys in the currently searched node and smaller than the largest value of the key among the keys in the currently searched node, and has the value, which is not included in the currently searched node.

Alternatively, the means for reading the currently searched node and determining whether the index search route is changed may include a means, which compares an upper bound key and a lower bound key of the currently searched node with the target index key, and determines whether the index search route needs to be changed.

Alternatively, the means, which compares the upper bound key and the lower bound key of the currently searched node with the target index key, and determine whether the index search route needs to be changed, may include at least one of a means for determining to maintain the index search route when the target index key has the value smaller than that of the upper bound key, and a means for determining to maintain the index search route when the target index key has the value larger than that of the lower bound key.

Alternatively, the method may further include a means for reading a parent node connected with the currently searched node through a link and determining to perform the index search from the parent node when it is determined that the index search route needs to be changed.

Alternatively, the means for reading the parent node connected with the currently searched node through the link and determining to perform the index search from the parent node when it is determined that the index search route needs to be changed may include a means for comparing an upper bound key and a lower bound key of the parent node with the target index key and determining to perform the index search from the parent node.

Figure 7:
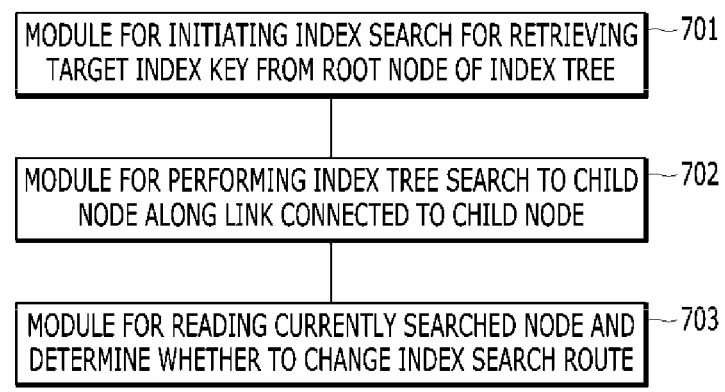
FIG. 7 is a block diagram illustrating a module for performing an index search in the database system according to the exemplary embodiment of the present disclosure.

FIG. 7 is a block diagram illustrating a module for performing an index search in the database system 10 according to the exemplary embodiment of the present disclosure.

The method of improving performance of data retrieval according to the exemplary embodiment of the present disclosure may be implemented by the modules described below.

The method of improving performance of data retrieval according to the exemplary embodiment of the present disclosure may be implemented by a module 701 for initiating an index search for retrieving a target index key from a root node of an index tree, a module 702 for performing an index tree search to a child node along a link connected to the child node, and a module 703 for reading a currently searched node and determining whether an index search route is changed.

Alternatively, the module for performing the index tree search to the child node along the link connected to the child node may include a module, which performs the index search to a low-direction lower child node connected to a low-direction lower link when the target index key has a value smaller than the smallest value of the key among the values of the keys in the currently searched node, performs the index search to a high-direction lower child node connected to a high-direction lower link when the target index key has a value larger than the largest value of the key among the values of the keys in the currently searched node, or performs the index search to a center-direction lower child node connected to a center-direction lower link when the target index key has a value larger than the smallest value of the key among the values of the keys in the currently searched node and smaller than the largest value of the key among the keys in the currently searched node, and has the value, which is not included in the currently searched node.

Alternatively, the module for reading the currently searched node and determining whether the index search route is changed may include a module, which compares an upper bound key and a lower bound key of the currently searched node with the target index key, and determines whether the index search route needs to be changed.

Alternatively, the module, which compares the upper bound key and the lower bound key of the currently searched node with the target index key, and determines whether the index search route needs to be changed, may include at least one of a module for determining to maintain the index search route when the target index key has the value smaller than that of the upper bound key, and a module for determining to maintain the index search route when the target index key has the value larger than that of the lower bound key.

Alternatively, the method may further include a module for reading a parent node connected with the currently searched node through a link and determining to perform the index search from the parent node when it is determined that the index search route needs to be changed.

Alternatively, the module for reading the parent node connected with the currently searched node through the link and determining to perform the index search from the parent node when it is determined that the index search route needs to be changed may include a module for comparing an upper bound key and a lower bound key of the parent node with the target index key and determining to perform the index search from the parent node.

Figure 8:
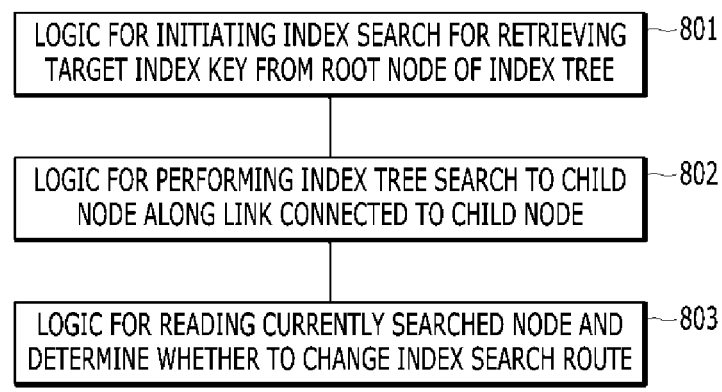
FIG. 8 is a block diagram illustrating logic for performing an index search in the database system according to the exemplary embodiment of the present disclosure.

FIG. 8 is a block diagram illustrating logic for performing an index search in the database system 10 according to the exemplary embodiment of the present disclosure.

The method of improving performance of data retrieval according to the exemplary embodiment of the present disclosure may be implemented by logic described below.

The method of improving performance of data retrieval according to the exemplary embodiment of the present disclosure may be implemented by logic 701 for initiating an index search for retrieving a target index key from a root node of an index tree, logic 802 for performing an index tree search to a child node along a link connected to the child node, and logic 803 for reading a currently searched node and determining whether an index search route is changed.

Alternatively, the logic for performing the index tree search to the child node along the link connected to the child node may include logic, which performs the index search to a low-direction lower child node connected to a low-direction lower link when the target index key has a value smaller than the smallest value of the key among the values of the keys in the currently searched node, performs the index search to a high-direction lower child node connected to a high-direction lower link when the target index key has a value larger than the largest value of the key among the values of the keys in the currently searched node, or performs the index search to a center-direction lower child node connected to a center-direction lower link when the target index key has a value larger than the smallest value of the key among the values of the keys in the currently searched node and smaller than the largest value of the key among the keys in the currently searched node, and has the value, which is not included in the currently searched node.

Alternatively, the logic for reading the currently searched node and determining whether the index search route is changed may include logic, which compares an upper bound key and a lower bound key of the currently searched node with the target index key, and determines whether the index search route needs to be changed.

Alternatively, the logic, which compares the upper bound key and the lower bound key of the currently searched node with the target index key, and determine whether the index search route needs to be changed, may include at least one of logic for determining to maintain the index search route when the target index key has the value smaller than that of the upper bound key, and logic for determining to maintain the index search route when the target index key has the value larger than that of the lower bound key.

Alternatively, the method may further include logic for reading a parent node connected with the currently searched node through a link and determining to perform the index search from the parent node when it is determined that the index search route needs to be changed.

Alternatively, the logic for reading the parent node connected with the currently searched node through the link and determining to perform the index search from the parent node when it is determined that the index search route needs to be changed may include logic for comparing an upper bound key and a lower bound key of the parent node with the target index key and determining to perform the index search from the parent node.

Figure 9:
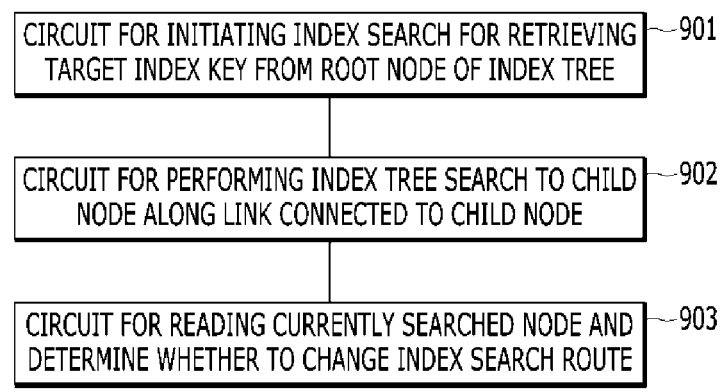
FIG. 9 is a block diagram illustrating a circuit for performing an index search in the database system according to the exemplary embodiment of the present disclosure.

FIG. 9 is a block diagram illustrating a circuit for performing an index search in the database system 10 according to the exemplary embodiment of the present disclosure.

The method of improving performance of data retrieval according to the exemplary embodiment of the present disclosure may be implemented by circuits described below.

The method of improving performance of data retrieval according to the exemplary embodiment of the present disclosure may be implemented by a circuit 901 for initiating an index search for retrieving a target index key from a root node of an index tree, a circuit 902 for performing an index tree search to a child node along a link connected to the child node, and a circuit 903 for reading a currently searched node and determining whether an index search route is changed.

Alternatively, the circuit for performing the index tree search to the child node along the link connected to the child node may include a circuit, which performs the index search to a low-direction lower child node connected to a low-direction lower link when the target index key has a value smaller than the smallest value of the key among the values of the keys in the currently searched node, performs the index search to a high-direction lower child node connected to a high-direction lower link when the target index key has a value larger than the largest value of the key among the values of the keys in the currently searched node, or performs the index search to a center-direction lower child node connected to a center-direction lower link when the target index key has a value larger than the smallest value of the key among the values of the keys in the currently searched node and smaller than the largest value of the key among the keys in the currently searched node, and has the value, which is not included in the currently searched node.

Alternatively, the circuit for reading the currently searched node and determining whether the index search route is changed may include a circuit, which compares an upper bound key and a lower bound key of the currently searched node with the target index key, and determines whether the index search route needs to be changed.

Alternatively, the circuit, which compares the upper bound key and the lower bound key of the currently searched node with the target index key, and determine whether the index search route needs to be changed, may include at least one of a circuit for determining to maintain the index search route when the target index key has the value smaller than that of the upper bound key, and a circuit for determining to maintain the index search route when the target index key has the value larger than that of the lower bound key.

Alternatively, the method may further include a circuit for reading a parent node connected with the currently searched node through a link and determining to perform the index search from the parent node when it is determined that the index search route needs to be changed.

Alternatively, the circuit for reading the parent node connected with the currently searched node through the link and determining to perform the index search from the parent node when it is determined that the index search route needs to be changed may include a circuit for comparing an upper bound key and a lower bound key of the parent node with the target index key and determining to perform the index search from the parent node.

Those skilled in the art shall recognize that the various illustrative logical blocks, configurations, modules, circuits, means, logic, and algorithm operations described in relation to the exemplary embodiments additionally disclosed herein may be implemented by electronic hardware, computer software, or in a combination of electronic hardware and computer software. In order to clearly exemplify interchangeability of hardware and software, the various illustrative components, blocks, configurations, means, logic, modules, circuits, and operations have been generally described above in the functional aspects thereof. Whether the functionality is implemented by hardware or software depends on a specific application or design restraints given to the general system. Those skilled in the art may implement the functionality described by various methods for each of the specific applications, but it shall not be construed that the determinations of the implementation deviate from the range of the contents of the present disclosure.

Figure 10:
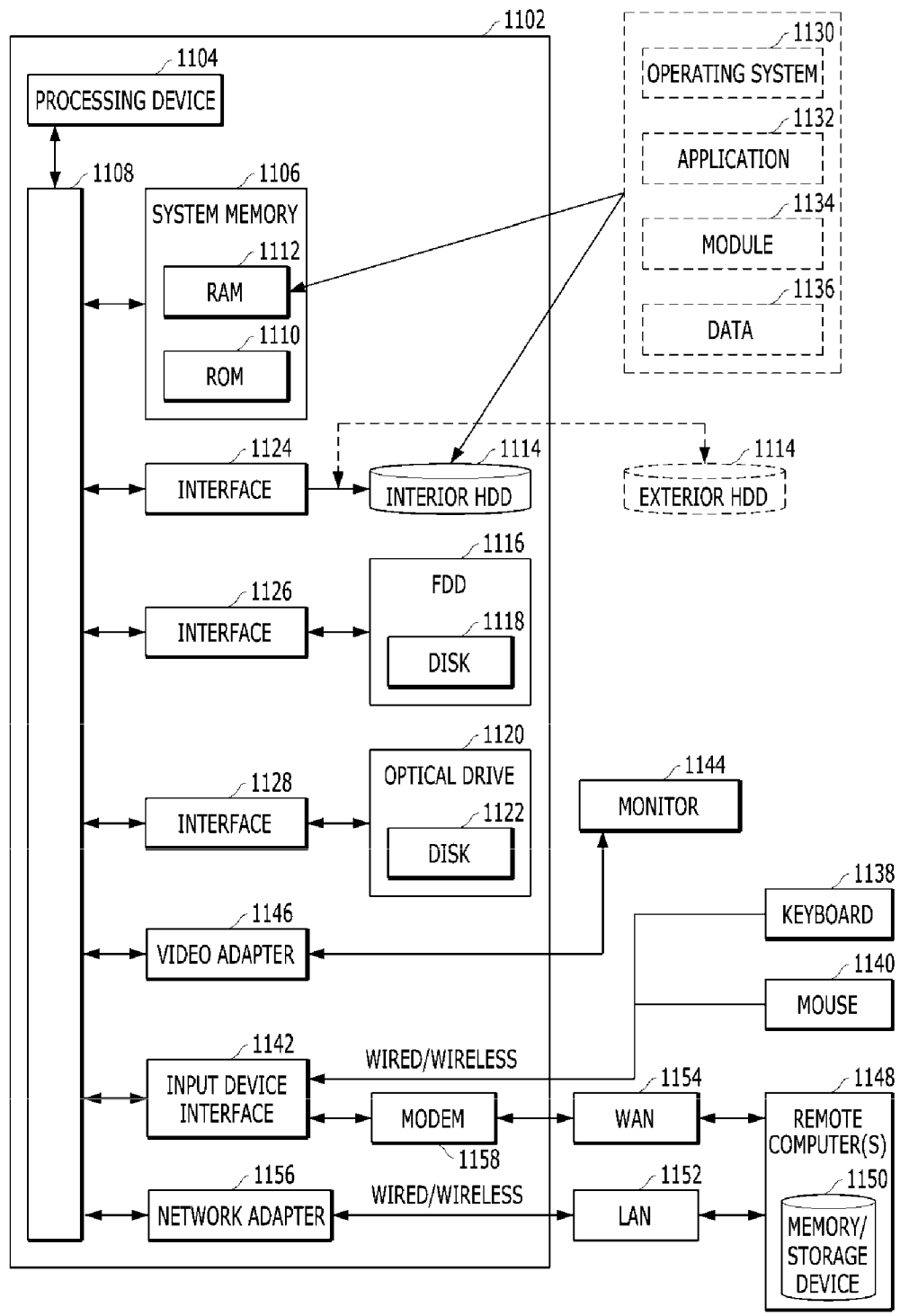
FIG. 10 is a block diagram of a computing device according to an exemplary embodiment of the present disclosure.

FIG. 10 is a block diagram of a computing device according to an exemplary embodiment of the present disclosure.

FIG. 10 is a simple and general schematic diagram of an illustrative computing environment, in which the exemplary embodiments of the present disclosure may be implemented.

The present disclosure has been generally described in relation to a computer executable command executable in one or more computers, but those skilled in the art will appreciate well that the present disclosure is combined with other program modules and/or be implemented by a combination of hardware and software.

In general, a program module includes a routine, a program, a component, a data structure, and the like performing a specific task or implementing a specific abstract data type. Further, those skilled in the art will appreciate well that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The exemplary embodiments of the present disclosure may be carried out in a distribution computing environment, in which certain tasks are performed by remote processing devices connected through a communication network. In the distribution computing environment, a program module may be positioned in both a local memory storage device and a remote memory storage device.

The computer generally includes various computer readable media. A computer accessible medium may be a computer readable medium regardless of the kind of medium, and the computer readable medium includes volatile and non-volatile media, transitory and non-non-transitory media, portable and non-portable media. As a non-limited example, the computer readable medium may include a computer readable storage medium and a computer readable transport medium. The computer readable storage medium includes volatile and non-volatile media, transitory and non-non-transitory media, portable and non-portable media constructed by a predetermined method or technology, which stores information, such as a computer readable command, a data structure, a program module, or other data. The computer storage medium includes a read only memory (RAM), a read only memory (ROM), electrically erasable and programmable ROM (EEPROM), a flash memory, or other memory technologies, a compact disc (CD)-ROM, a digital video disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally includes all of the information transport media, such as a carrier wave or other transport mechanisms, which implement a computer readable command, a data structure, a program module, or other data in a modulated data signal. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, radio frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various common processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an erasable and programmable ROM (EPROM), and an EEPROM, and the BIOS includes a basic routine helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for outer mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of predetermined data in an appropriate digital form. In the description of the computer readable storage media, the HDD, the portable magnetic disk, and the portable optical media, such as a CD, or a DVD, are mentioned, but those skilled in the art will appreciate well that other types of compute readable storage media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display device are also connected to the system bus 1108 through an interface, such as a video adapter 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a workstation, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, Internet.

When the computer 1102 is used in the LAN networking environment, the computer 1102 is connected to the local network 1152 through a wired and/or wireless communication network interface or an adapter 1156. The adapter 1156 may make wired or wireless communication to the LAN 1152 easy, and the LAN 1152 may also include a wireless access point installed therein for the communication with the wireless adapter 1156. When the computer 1102 is used in the WAN networking environment, the computer 1102 may include a modem 1158, is connected to a communication computing device on a WAN 1154, or includes other means setting communication through the WAN 1154 via the Internet and the like. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, electric fields or particles, optical fields or particles, or a predetermined combination thereof.

Those skilled in the art will appreciate that the various illustrative logical blocks, modules, processors, means, circuits, and algorithm operations described in relation to the exemplary embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various exemplary embodiments presented herein may be implemented by a method, a device, or a manufactured article using a standard programming and/or engineering technology. A term "manufactured article" includes a computer program, a carrier, or a medium accessible from a predetermined computer-readable device. Herein, the media may include storage media and transport media. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information. Further, the transport media include a wireless channel and various other media, which are capable of transporting a command(s) and/or data, but are not limited thereto.

It shall be understood that a specific order or a hierarchical structure of the operations included in the presented processes is an example of illustrative accesses. It shall be understood that a specific order or a hierarchical structure of the operations included in the processes may be re-arranged within the scope of the present disclosure based on design priorities. The accompanying method claims provide various operations of elements in a sample order, but it does not mean that the claims are limited to the presented specific order or hierarchical structure.

The description of the presented exemplary embodiments is provided so as for those skilled in the art to use or carry out the present disclosure. Various modifications of the exemplary embodiments may be apparent to those skilled in the art, and general principles defined herein may be applied to other exemplary embodiments without departing from the scope of the present disclosure. Accordingly, the present disclosure is not limited to the exemplary embodiments suggested herein, and shall be interpreted within the broadest meaning range consistent to the principles and new characteristics suggested herein.

What is claimed is:

1. A non-transitory computer readable storage medium including instructions that when executed by one or more processors perform a method for improving data retrieval performance, the method comprising:

initiating an index search for retrieving a target index key from a root node of an index tree;

performing an index tree search to a child node along a link connected to the child node;

reading a currently searched node;

comparing an upper bound key and a lower bound key of the currently searched node with the target index key, wherein at least one of the upper bound key or the lower bound key of each node, which corresponds to an index structure change, is updated; and determining whether the index search route needs to be changed;

wherein when the index structure is changed during the index search process, the index structure change is detected based on the upper bound key and the lower bound key, and when the structure of the index tree is changed during the index search process and the change of the index search route is determined, the index search is retried from a close node based on the upper bound key and the lower bound key.

2. The non-transitory computer readable storage medium of claim 1, wherein the performing the index tree search to the child node along the link connected to the child node includes:
 performing the index search to a low-direction lower child node connected to a low-direction lower link when the target index key has a value smaller than a smallest value of a key among values of keys in the currently searched node;
 performing the index search to a high-direction lower child node connected to a high-direction lower link when the target index key has a value larger than a largest value of a key among the values of the keys in the currently searched node, or
 performing the index search to a center-direction lower child node connected to a center-direction lower link when the target index key has a value larger than the smallest value of the key among the values of the keys in the currently searched node and smaller than the largest value of the key among the values of the keys in the currently searched node.

3. The non-transitory computer readable storage medium of claim 2, wherein the low-direction lower link is a link connected to a child node including a key having a value smaller than the smallest value of the key included in the currently searched node among the child nodes,
 the high-direction lower link is a link connected to a child node including a key having a value larger than the largest value of the key included in the currently searched node among the child nodes, and
 the center-direction lower link is a link connected to a child node including a key having a value, which is larger than the smallest value of the key and is smaller than the largest value of the key included in the currently searched node among the child nodes.

4. The non-transitory computer readable storage medium of claim 1, wherein the upper bound key is the largest value of the index key includable in the currently searched node, and the lower bound key is the smallest value of the index key includable in the currently searched node.

5. The non-transitory computer readable storage medium of claim 1, wherein the determining whether the index search route needs to be changed includes at least one of:
 determining to maintain the index search route when the target index key has a value smaller than the upper bound key; and
 determining to maintain the index search route when the target index key has a value larger than the lower bound key.

6. The non-transitory computer readable storage medium of claim 1, further comprising:
 reading a parent node connected with the currently searched node through a link; and
 determining to perform the index search from the parent node, or higher node of the parent node when it is determined that the index search route needs to be changed.

7. The non-transitory computer readable storage medium of claim 6, wherein the reading the parent node connected with the currently searched node through the link and the determining to perform the index search from the parent node when it is determined that the index search route needs to be changed include:
 comparing an upper bound key and a lower bound key of the parent node with the target index key; and
 determining to perform the index search from the parent node.

8. A method of improving data retrieval performance performed by one or more processors of a computing device, the method comprising:
 initiating an index search for retrieving a target index key from a root node of an index tree;
 performing an index tree search to a child node along a link connected to the child node;
 reading a currently searched node;
 comparing an upper bound key and a lower bound key of the currently searched node with the target index key, wherein at least one of the upper bound key or the lower bound key of each node, which corresponds to an index structure change, is updated; and
 determining whether the index search route needs to be changed;
 wherein when the index structure is changed during the index search process, the index structure change is detected based on the upper bound key and the lower bound key, and
 when the structure of the index tree is changed during the index search process and the change of the index search route is determined, the index search is retried from a close node based on the upper bound key and the lower bound key.

9. A computing device, comprising:
 one or more processors; and
 a memory configured to store commands executable by the one or more processors,
 wherein the one or more processors are configured to:
  initiate an index search for retrieving a target index key from a root node of an index tree;
  perform an index tree search to a child node along a link connected to the child node;
  read a currently searched node;
  compare an upper bound key and a lower bound key of the currently searched node with the target index key, wherein at least one of the upper bound key or the lower bound key of each node, which corresponds to an index structure change, is updated; and
  determine whether the index search route needs to be changed;
  wherein when the index structure is changed during the index search process, the index structure change is detected based on the upper bound key and the lower bound key, and
  when the structure of the index tree is changed during the index search process and the change of the index search route is determined, the index search is retried from a close node based on the upper bound key and the lower bound key.

* * * * *